United States Patent Office 2,832,689
Patented Apr. 29, 1958

2,832,689

PRESERVATION OF ORGANIC MATERIALS BY IRRADIATION

Bernard E. Proctor, Cambridge, and Samuel A. Goldblith, Melrose, Mass., assignors to Research Corporation, New York, N. Y., a corporation of New York No Drawing. Application January 24, 1952
Serial No. 268,136

2 Claims. (Cl. 99—157)

This invention relates to the preservation of organic materials such as foods, drugs, tissues, and tissue fluids (e. g. blood), and more particularly concerns a method for minimizing the change in physical, chemical and organoleptic characteristics of such materials when sterilization employing high energy radiation is used.

It has been known for some time that high energy radiation such as cathode rays, beta particles, X-rays, or γ-rays are capable of sterilizing the substances exposed to them. An obvious possibility is that of using such radiation to kill all bacteria in foods or drug products being preserved; however, attempts along this line have been handicapped by the fact that frequently such radiations seriously changed the characteristics of the foodstuffs or other substances exposed to them, and in particular had the effect of changing organoleptic properties of flavor and color of food.

Early efforts which were aimed at overcoming these side effects and which met with only limited success were freezing and the use of inert atmosphere or a vacuum. Substances which are irradiated in a frozen state (for example, meat) show a reduced but still deleterious amount of change in most cases. While the process of irradiating material in a vacuum or inert atmosphere also resulted at first in an apparent reduction of harmful effects, it soon became apparent that the improvement was illusory, since increased amounts of radiation were required under these conditions, thereby adding expense without showing any net improvement.

It is the object of this invention to provide an improved method for preserving in a relatively unchanged condition the characteristics of organic materials exposed to high energy radiation.

The process described is based on the theory that the undesirable effects of the radiation are due not to the effect of the radiation on the tissues or solutes involved but rather is due to a breaking down of the solvent (e. g. water) contained in those tissues or solutions into the free-radicals [OH] and H. These radicals, in turn, act either as oxidizing or reducing agents and in so doing form chemical compounds which change the characteristics of the tissues or materials concerned. According to the invention the use of certain materials or compounds added to the substances to be irradiated permits sterilization and at the same time preserves the flavor, color, odor, texture, and other desirable physical characteristics of the irradiated material. Compounds which give rise to this result will be herein termed free-radical acceptors.

The process consists variously of mixing one of these materials in a finely divided or liquid form with the organic material to be preserved also in a divided or liquid form and exposing the mixture to high energy radiation in a manner well known to those skilled in the art. It is also possible and in some cases desirable to immerse (or impregnate) relatively large segments of the material to be preserved in solutions of the free-radical acceptor to be used and to irradiate said portion after it has absorbed a sufficient amount of the protecting material.

A primary requirement for such a material as the name implies is that it shall combine with the radiation-produced free radical (i. e. act as an oxidizing or reducing agent) more readily than the free radical would combine with any part of the substance being preserved. This is, however, not enough. The acceptor must be itself harmless in view of the end use of the stored substance, and the by-products finally produced by the radiation (i. e. combination with the radical) must be harmless. In addition, it must be highly efficient as an acceptor in order to completely prevent undesirable effects and also in order that minimum amounts of acceptor may be sufficient.

We have discovered a number of compounds that are effective and meet the above requirements. Some of the most successful free-radical acceptors where the free hydroxyl radical is causing undesirable effects in food preservation have been found to be l-ascorbic and d-isoascorbic acid and their derivatives, analogues, or isomers. When these substances are added to, for example, meat which is to be preserved, the meat can be completely sterilized by irradiation at room temperature without noticeable change in color or flavor. A solution of sodium sulfite has also been proven effective as have sodium metabisulphite, sulphur dioxide, and nicotinic acid and its amide.

In the radiation sterilization of ascorbic acid itself it has been found that nicotinic acid (i. e. niacin), its amide, and their analogues or isomers, are highly effective acceptors, approximately 10 micrograms of niacin being able to protect as much as 500 micrograms of ascorbic acid. The effect of the niacin is shown by comparing the effect of the radiation with and without the presence of the niacin

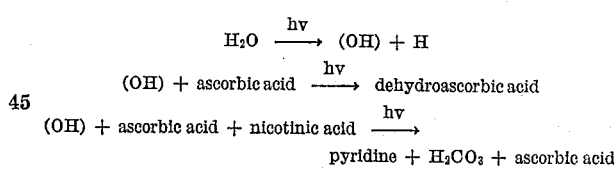

Further compounds which may be preferable in protecting one or more food or drug compounds, or blood, are cysteine, glutathione, sodium nitrate, sodium nitrite, riboflavin, and analogues or isomers of the same.

It should be noted that the problem of protecting against the reaction of a free radical is far more difficult than the problem of counteracting simple oxidation or reduction, since the free radical is far more active than the same particle as an ion. This fact greatly increases the difficulty of neutralizing the particle before it can react with the organic compound being preserved. Therefore this process constitutes a valuable contribution to the art of food preservation where high energy radiation is used.

Having thus described our invention, we claim:

1. The method of treating water-containing animal product foodstuffs, such as meats, for preservation thereof by high-energy ionizing radiation, comprising adding to said foodstuffs a protecting substance to protect said foodstuffs from organoleptic deterioration under the influence of the radiation, said substance comprising a free radical acceptor to combine preferentially with the free radicals formed by the dissociation of water under the influence of radiation, and thereafter subjecting said foodstuffs with said protecting substance to high-energy ionizing radiation.

2. The method according to claim 1 in which the protecting substance comprises at least one material selected from the group consisting of l-ascorbic acid, d-isoascorbic acid, and their derivatives, analogues and isomers.

References Cited in the file of this patent

UNITED STATES PATENTS

| | | |
|---|---|---|
| 2,196,361 | Liebesny et al. | Apr. 9, 1940 |
| 2,223,813 | Brown | Dec. 3, 1940 |
| 2,456,909 | Brasch | Dec. 21, 1948 |
| 2,474,649 | Birdseye | June 28, 1949 |
| 2,534,222 | Brasch | Dec. 19, 1950 |
| 2,583,686 | Ment | Jan. 29, 1952 |